Oct. 1, 1968
C. J. HICKEY
3,403,729
APPARATUS USEFUL FOR TREATING WELLS
Filed March 27, 1967
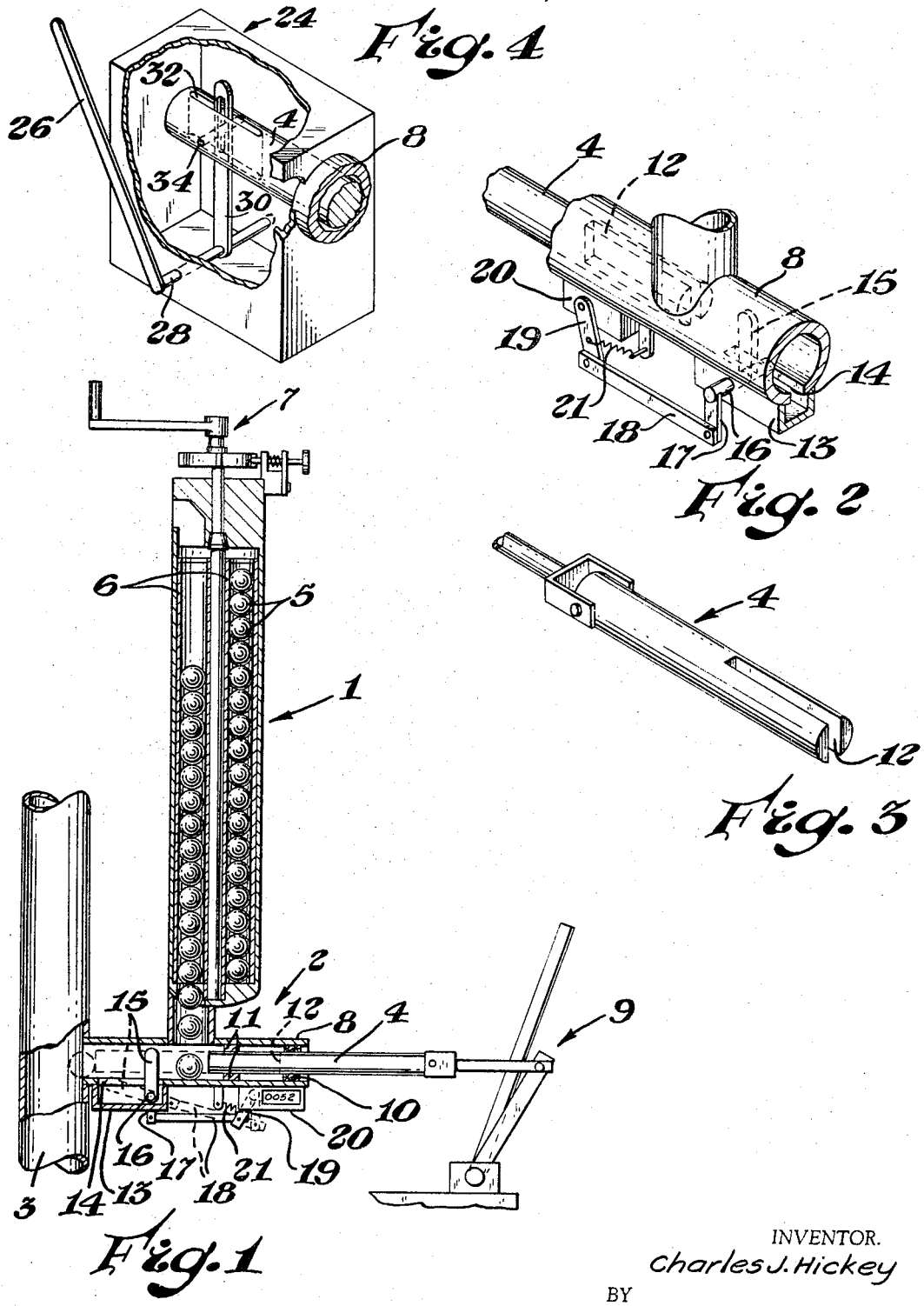
INVENTOR.
Charles J. Hickey
BY
C. W. Catlin
ATTORNEY

United States Patent Office 3,403,729
Patented Oct. 1, 1968

3,403,729
APPARATUS USEFUL FOR TREATING WELLS
Charles J. Hickey, Hobbs, N. Mex., assignor to The Dow Chemical Company, Midland, Mich., a corporation of Delaware
Filed Mar. 27, 1967, Ser. No. 626,243
5 Claims. (Cl. 166—75)

ABSTRACT OF THE DISCLOSURE

An apparatus for controlled ejectment of spheroidal objects into a fluid-carrying conduit having perforations as a means of fluid outlet therefrom whereby an accurate count of such ejected objects is accurately maintained, comprising a reciprocating plunger-cylinder assembly whereby each stroke of the plunger carries one such object, when placed in front of it, into the fluid but which stroke is only recorded and counted if an object is actually pushed ahead of the plunger and into the fluid.

---

The closest art known to applicant is: Derrick et al., U.S. Patent 2,754,910; Ayers et al., U.S. Patent 2,933,-136; Stogner et al., U.S. Patent 2,955,654.

The invention is concerned with the injection of spheroidal objects into a pipe or casing for the purpose of obstructing flow outwardly therefrom through apertures or perforations in the pipe or casing.

Fluid-bearing formations, e.g., those bearing natural gas, oil, water, or brine, are sometimes subjected to hydraulic fracturing to stimulate the production of fluid therefrom. Hydraulic fracturing, in brief, means injecting a fluid, usually water, oil, or emulsions thereof, commonly containing a propping agent such as 10 to 60 (usually 20 to 40) mesh sand, and, as desired, also other agents such as diverting agents, friction-loss agents, and fluid-loss agents, at sufficient pressure to create fractures in the formation.

Hydraulic fracturing is often conducted in cased wells, access of the fracturing fluid employed to the formation being through perforations in the casing, located at fluid-producing levels.

In a fracturing job via a cased well, the fracturing fluid is usually injected down a tubing having an outlet in the vicinity of the level of the apertures in the casing. Packers are usually positioned in the annulus between the tubing and the casing preferably at levels both above and below the apertures leading to the fluid-producing reservoirs of the formation or strata where fracturing is desired.

One obstacle, not fully overcome in fracturing jobs, has long been that associated with the fracturing fluid exiting from the casing largely through those perforations leading to the more open or permeable portions of the strata being fractured. This is undesirable because the portions of the strata being treated which are in greatest need of fracturing are usually thus by-passed and which, therefore, subsequently tend to remain nearly as tight and impermeable to fluid flow as before the treatment.

To overcome this type of obstacle or difficulty, it has been known to employ relatively small spheroidal objects, of a specified density in relation to that of the fracturing fluid and of a minimum cross-section which is slightly greater than that of the perforations. During the fracturing process, the spheroidal objects are fed into the fracturing fluid and a substantial number of them caused to lodge in perforations, in the casing, out through which a large proportion of the fluid is passing into the formation, thus substantially closing off passage of fluid therethrough and diverting it to those perforations through which a smaller proportion of the fluid had been passing. Upon completion of the fracturing treatment and release of positive pressure, the spheroidal objects can be conveniently recirculated out of the well.

For making the spheroidal objects, resilient or compressible material is preferred. A variety of materials, of suitable density, may be employed including either synthetic or natural rubber or one or more synthetic resinous materials of limited compressibility, of which nylon is particularly suitable. The shape may be ellipsoidal, oblong or the like but is generally spherical. The preferred spheroidal objects to use are those which provide limited but highly restricted passage of fluid, e.g. as described in U.S. Patent 2,933,136 to Ayers et al. The spheroidal resilient objects, although (as stated) not necessarily true spheres, are often referred to in the art as ball sealers or sometimes merely as balls, and such designation is sometimes used hereinafter. To facilitate the practice of such treatments, mechanisms or devices for injecting ball sealers have been devised. One such mechanism is that described in U.S. Patent 2,955,654 to Stogner et al.

Knowledge of the number of ball sealers injected and control of such number, during a specific treating job, are important considerations. Despite the importance thereof, satisfactory methods or means for maintaining the count of the number of ball sealers injected and control of the number injected has heretofore not been available. A need therefore accordingly exists.

The invention meets this need. It is an improved apparatus for ejecting ball sealers associated with fracturing a geologic formation wherein a fluid is injected down a cased well and back into the formation, through perforations in the casing, at fracturing pressures. An apparatus for ejecting ball sealers into a fluid and positioning them in casing perforations commonly employs a storage chamber for ball sealers comprising at least one cartridge containing a series of ball sealers for systematically feeding the ball sealers into a fracturing fluid injection line and a control means for selectively releasing the balls, as desired, into said injection line. The invention consists of an improvement comprising a counting device as hereinafter illustrated and described.

In the apparatus of the invention, the storage chamber for ball sealers and the cartridge therein may be as substantially described in the Stogner et al. patent, e.g. as illustrated in FIG. 2 of the patent, except that item 23 (the member for direct attachment to the pipe extending down into a wellbore) is not present in the instant invention. In its place is the improved ejector member (hereinafter sometimes called expeller-counter member) designated item 2 on the figures of the annexed drawing.

In the drawing:
FIGURE 1 is an elevational view of a ball sealer ejector apparatus including a storage chamber 1 as known in the art and the improved expeller-counting assembly 2 of the invention both of which have parts broken away to show structure, and pipe 3 leading down a wellbore (not shown);

FIGURE 2 is an isometric view of expeller-counter assembly 2 of the invention depicting some interior structure including plunger 4;

FIGURE 3 is an isometric view of plunger 4 of FIGURE 2.

FIGURE 4 is a modification of the operating means for expeller-counter assembly 2 (showing a portion of the plunger and confining cylinder of FIGURE 2) wherein that portion of the plunger which extends rearwardly from the cylinder when retracted is fully enclosed in a high strength housing 24, which fits in fluid tight engagement about the rear end of the cylinder.

Various elements or items comprising the mechanisms of the apparatus and parts thereof shown in FIGURES 1 to 4 are identified in more detail as follows:

Item 1 is a vertically elongated storage chamber which serves as a reservoir for ball sealers 5 which are positioned therein in cartridges 6 which maintain the ball sealers in four orderly vertical rows. (Only two of the cartridges are visible on the drawing since FIGURE 1 is largely a cross-sectional view taken at the midsection of the chamber.) Chamber 1 may be rotated by means of crank assembly 7 which can be manually turned thereby to align any one of the cartridges with the restricted outlet opening in the bottom of the chamber.

Expeller-counter assembly 2 comprises, as one essential part, a substantially horizontal cylinder 8 having a circumferential opening in the top thereof which provides direct communication with the opening in the bottom of chamber 1 whereby ball sealers may pass singly downwardly therethrough. A further essential part of assembly 2 is plunger 4 which can be reciprocated at will in cylinder 8 by means of reciprocatory shaft and handle unit 9. Packing gland 10 provides a seal at the entrance end of cylinder 8 through which plunger 4 extends. Guides 11 maintain plunger 4 in horizontal alignment as it is reciprocated in cylinder 8. The plunger is provided with a vertical groove 12 in the forward end thereof which extends rearwardly diametrically through the plunger to a limited distance as explained hereinbelow. Forming an integral part, at the bottom of and near the fore-end, of cylinder 8, is relatively small compartment 13 which is open to cylinder 8 by way of slot 14 which is longitudinally formed in the cylinder bottom. A further essential of assembly 2 is the upwardly extending hinged detent or lever 15 journaled on pin 16 positioned transversely in compartment 13 which permits lever 15 to move forward and return through an arc approaching 90° from the vertical toward the outlet end of cylinder 8. Secured to pin 16 on the end thereof and extending exteriorly of chamber 13 is a short substantially vertical (when lever 15 is upright) arm 17 which is connected to a longer nearly horizontal arm 18 which in turn is connected to a second relatively short nearly vertical arm 19 which controls the counting mechanism of counting box 20, which automatically records the number of times lever 15 swings forward and returns. Connected to arm 19, near the lower end thereof, is tension spring 21 which becomes strained or extended whenever force causes the lever to swing forward and which as a result thereof pulls the lever back into the upright position when the force is no longer applied.

Groove 12 extends rearwardly through the vertical diameter of plunger 4 to a ditsance which is at least greater than the distance from the rear edge of the lever to the outlet end of cylinder 8 but to an insufficient extent to detract from the necessary strength of the plunger.

Vertical pipe 3 represents a conduit, usually tubing (although injection may be via a well casing directly), which enters a wellbore and extends downwardly to a level opposite perforations in a casing through which a fluid being injected passes out into the formation penetrated by the well.

In FIGURE 4, housing 24 is shown inclosing the rear end of cylinder 8, in fluid-tight engagement, so that plunger 4 is completely enveloped with fluid when in use. Lever 26, when moved forward twists rod 28 clockwise, thereby causing lever 30, which passes through slot 32 in the plunger and is engaged therewith by means of pin 34, to advance plunger 4.

The apparatus of the invention may be operated as follows: spheriodal objects serving as ball sealers 5, e.g., substantially spherical balls of suitable size and density (preferably containing striations on the surface or small channels therethrough to provide limited fluid pasage) are loaded into cartridges of the vertically positioned chamber 1. The chamber is then tightly sealed to provide against fluid leaks which might occur as a result of high pressure in the apparatus and atmospheric pressure outside of the apparatus. Fluid is caused to flow through treating pipe 3 which leads from a source thereof under pressure or via a pump and, as shown, is in communication with cylinder 8 containing reciprocating plunger 4. Plunger 4 fits sufficiently loosely in the cylinder to insure substantially equal presure on the circumferential side and both ends of the plunger. Fluid is present in all parts of cylinder 8 at the same presure as exists in pipe 3. As treating fluid flows, ball sealers 5 at a desired rate or frequency are caused to drop from chamber 1 into horizontal cylinder 8 while plunger 4 is in retracted position. After a single ball sealers drops, the plunger is caused to move forward, either by manual operation accomplished by using the handle and shaft assembly 9 or by any well known cam arrangement which can be power-driven at a desired rate. As each ball sealer is dropped in front of the plunger, it is pushed forward by the advancing plunger and thereby caused to enter treating line 3 whereupon it is swept by the fluid therein down the pipe and in all probability will be among those caused to lodge in a casing perforation. A ball sealer will be pushed into the fluid in the treating line only as a result of the plunger being moved forward. However, if no ball is dropped from cartridge 6 into barrel 8, plunger 4, even though moved completely forward, does not trip lever 15, since (due to the groove which is in mating relationship with the lever) the lever is not contacted. The forward end of the plunger straddles the lever without tripping it unless a ball sealer is pushed ahead of the plunger. Accordingly, an accurate count of ball sealers ejected into pipe 3 and thence forced down the wellbore is maintained since only each forward movement of the lever, which occurs only when a ball is pushed ahead of it, is recorded automatically on counting box 20.

The following example is illustrative of the practice of the invention:

*Example 1*

An oil-producing subterranean formation penetrated by a well located in a field in the vicinity of Roosevelt, N. Mex., was desired to be acidized and fractured. The well was cased with a 5½-inch diameter casing extending through the producing formation. The casing was provided with a 2-inch tubing to a depth of 4076 feet. The casing had been perforated with 20 perforations at the producing depth of between 4136 feet and 4281 feet. An acidizing composition, comprising 15 percent HCl and a small but effective amount of an inhibitor to the corrosivity of the acid to metal dissolved in water, was brought on location. A suitable layout of pumping, piping, and pressure-indicating devices was set up whereby the acidizing solution would enter the well by way of pipe 3 as represented on the drawing.

A quantity of 2⅞-inch diameter resilient spherical ball sealers was loaded into the storage chamber, of the nature of that depicted as item 1 on the drawing, and the chamber tightly closed. Suitable packers were emplaced in the annulus between the casing and the tubing both above and below the perforations. The acidizing solution was started down the well and, after a pressure of 1,500 p.s.i. was attained, fracturing was indicated by a leveling off of the pressure as shown on pressure-recording instruments. Thereafter, periodically, shaft and handle unit, indicated as 9 on the drawing, was operated by pushing the handle forward, thereby causing the ball to trip lever 15, as shown on the drawing, which in turn caused an additional number to be registered on counting box 20. The ball sealers thus ejected were injected down the pipe at a rate of about 2 balls per 3 barrels of injected fluid. The balls so ejected were accurately counted by the counting mechanism of the invention. A total of 30 balls were shown to have been ejected in all by the count on counting box 20. Thus, ball sealers were being forced into perforations and thereby inhibiting fluid flow through those perforations in which they lodged, as was observed by the accompanying variations in pressure as shown on the pressure registering instruments on the top of the well. Maximum pressure during injection was 2,800 p.s.i. A total of 20 (42-gallon) barrels of acidizing composition was employed in the treatment. This was followed by a flush employing water in the amount of 20 barrels. The average liquid injection rate was 4.3 barrels per minute. An actual count of the ball sealers which had not been ejected was made following treatment. The number of balls remaining in the storage chamber was 30 balls less than were present prior to treatment, thus verifying the number injected down the casing as recorded on the counting box.

*Example 2*

An oil-producing formation in the Chevaroo pool in the San Andres formation in New Mexico was desired to be acidized and fractured. The well was cased with a 4½-inch casing to a depth of 4430 feet and provided with a 2-inch diameter tubing to a depth of 4044 feet. 16 perforations had been made in the casing at a level of between 4162 and 4304 feet. Packers were positioned in the annulus between the tubing and casing both above and below the perforations, the top packer being located at 4060 feet. An acidizing-fracturing fluid comprising 15 percent by weight aqueous HCl and a small amount of an inhibitor to the corrosivity of acid to metal was brought on location. A suitable hookup was made for injecting the fluid down the well, employing the ball sealer-ejecting apparatus of the invention. Ball sealers of 2⅞-inch diameter were loaded into storage chamber 1 as shown in the drawing and the chamber tightly closed. Injection of fluid was started down the pipe represented by number 3 on the drawing. The pressure gradually rose to 2,250 p.s.i. when a fracture was shown to occur. Injection of fluid continued and ball sealers were then ejected singly, into line 3 by moving plunger 4 forward by means of shaft and handle assembly 9. Ball sealers lodged in perforations in the casing as shown by the rise in pressure, at the surface instruments, to 5,200 p.s.i. On a few occasions when a ball sealer failed to drop, though the plunger was moved forward, the count on counting box 18 was unchanged. The counting box showed that 25 ball sealers were ejected during the injection of 37 barrels of acidizing-fracturing fluid. The success of the use of the ball sealers was evidenced by the rapid rise in pressure as the balls were injected down the well. 60 barrels of acidizing-fracturing fluid were injected in all. An investigation of the accuracy of the counting assembly of the apparatus showed that the count on the counting box was the actual number of balls injected.

It is to be understood that modifications may be made in the practice of the invention and in the mechanism used for ejecting the ball sealers, within the scope and spirit of the invention. For example obvious changes, as desired, may be made in the means for dropping ball sealers into horizontal chamber 8 ahead of the plunger. The exact design of the lever which trips the counting device may be such as permit positioning of the plunger-activating assembly entirely within the cylindrical portion of the impeller assembly without the need for chamber 13. The modification shown in FIGURE 4, for example, illustrates one variation wherein a fluid-tight housing, which may be as shown or cylindrical or other shape entirely enclosing the rear portion of cylinder 8 with only the fore part of cylinder 8, the counting box, and an operating arm (for properly registering lever movements) located exterior of said housing. Such modification offers the advantage of not requiring plunger 4, when advanced, to push against the pressure of the fluid being injected. Also, if preferred, the lever may be hinged or otherwise secured from the side or top of cylinder 8 or an adjacent chamber for such purpose.

It is to be noted that the storage chamber of a ball-ejecting apparatus holds upwards to 200 ball sealers or more which is usually considered adequate for the treatment of a number of wells. Accordingly the chamber need not be opened after each well treatment but is continued in use until all the balls have been used up if the actual count of balls used is known as is made possible by the invention. In the above examples, the chamber was opened and balls actually manually counted only for exemplary purposes thereby to corroborate the accuracy of the counter of the invention. The presence of the counter not only shows the actual number of balls injected in each well treated but also provides against the unnecessary opening of a storage chamber for the purpose of ascertaining how many balls, if any, are left therein for use in treating succeeding wells.

Having described my invention, what I claim and desire to protect by Letters Patent is:

1. In an apparatus for ejecting spheroidal objects into a conduit having perforations for selectively temporarily lodging said objects in said perforations to inhibit free fluid flow outwardly therethrough, wherein a reservoir supplies said spheroidal objects to a pipe carrying fluid to the perforations in the conduit whereby the fluid sweeps the so ejected objects along therewith:

the improvement, which ejects the spheroidal objects one at a time and automatically counts and records the number of ejected spheroidal objects, comprising a substantially vertically positioned reservoir to provide a supply of the spheroidal objects, a substantially horizontal cylinder which has a rear-end and an outlet fore-end and which is in communication with said vertical reservoir to receive the spheroidal objects singly by means of connecting parts near said fore-end, a reciprocatory plunger, operating within said cylinder between the place of communication at said connecting parts and the fore-end of said cylinder whereby the plunger, when moved forward, pushes a single spheroidal object along ahead of it, a substantially diametrical slot in the spheroidal object-contacting front end of said plunger which divides said end into two substantially semicircular halves, a lever extending diametrically from the circumferential side of the horizontal cylinder and substantially transverse thereto when the plunger is retracted toward the rear-end of the cylinder, said lever being in sliding mating relationship with said slot when the plunger moves whereby the front end of said plunger straddles the lever when moved forward unless a spheroidal object is pushed ahead of the plunger, said lever being hinged to provide arcuate movement of the outer end of the lever when a force in the form of a moving spheroidal object is applied against it in the direction of the fore-end of the cylinder, and a tension spring attached to the lever which spring is strained as the lever is moved arcuately in the direction of said fore-end and which pulls the lever back into its transverse position when the force acting against it has been released, a counting member containing a counting mechanism for recording successive numbers, an arm attached to said lever and extending therefrom to said counting member, said lever thereby causing a number to be added by said counting mechanism on the counting member for each arcuate swing of the lever, which occurs only when a spheroidal object is pushed ahead of the plunger, whereby an accurate count of the spheroidal objects ejected in the fluid and carried thereby into the conduit is made of record.

2. The apparatus of claim 1 wherein said lever extends upwardly in a generally vertical position from pivotal attachment to a pin positioned transversely in said cylinder near the bottom thereof.

3. The apparatus of claim 2 wherein a longitudinal slot exists in the bottom of said cylinder to receive said lever when pushed forward by a spheroidal object ahead of said plunger.

4. The apparatus of claim 3 wherein a relatively small chamber is attached to said cylinder below said slot and wherein said pin pivotally supporting said lever is positioned transversely in the chamber below said cylinder.

5. The apparatus of claim 1 wherein at least the exposed portion of said plunger and at least the rear end of said substantially horizontal cylinder is enclosed by a high-strength housing whereby the pressure being exerted against said plunger by fluid being injected is substantially the same on any surface thereof.

References Cited

UNITED STATES PATENTS

| | | | |
|---|---|---|---|
| 2,755,742 | 7/1956 | Vincent | 15—104.06 X |
| 2,961,046 | 11/1960 | Moeller et al. | 166—75 |
| 3,028,996 | 4/1962 | Ellett | 15—104.06 X |

JAMES A. LEPPINK, *Primary Examiner.*